(12) United States Patent
Franco

(10) Patent No.: US 8,397,975 B1
(45) Date of Patent: Mar. 19, 2013

(54) TACK WELDING CLAMPS FOR AXIALLY ALIGNING AND HOLDING CURVED OR STRAIGHT TUBULAR SECTIONS

(76) Inventor: Victor M. Franco, Austin, TX (US)

(*) Notice: Subject to any disclaimer, the term of this patent is extended or adjusted under 35 U.S.C. 154(b) by 0 days.

(21) Appl. No.: 13/171,450

(22) Filed: Jun. 29, 2011

(51) Int. Cl.
*B23K 37/00* (2006.01)
(52) U.S. Cl. ............................ 228/44.5; 228/212; 269/37
(58) Field of Classification Search ................. 228/44.5, 228/212; 269/37
See application file for complete search history.

(56) References Cited

U.S. PATENT DOCUMENTS

| | | | | | |
|---|---|---|---|---|---|
| 3,422,519 | A | * | 1/1969 | Fehlman | 29/281.5 |
| 3,722,038 | A | * | 3/1973 | Arntz et al. | 29/281.1 |
| 3,925,854 | A | * | 12/1975 | McFadden | 29/252 |
| 3,944,202 | A | * | 3/1976 | Dearman | 269/130 |
| 4,750,662 | A | * | 6/1988 | Kagimoto | 228/44.5 |
| 5,052,608 | A | * | 10/1991 | McClure | 228/44.5 |
| 5,165,160 | A | * | 11/1992 | Poncelet | 29/464 |
| 6,325,277 | B1 | * | 12/2001 | Collie | 228/212 |
| 6,427,993 | B1 | * | 8/2002 | Prochac | 269/37 |
| 6,990,712 | B2 | * | 1/2006 | Shelton | 29/237 |
| 7,540,401 | B2 | * | 6/2009 | Vermaat | 228/212 |

* cited by examiner

*Primary Examiner* — Nicholas P D'Aniello
(74) *Attorney, Agent, or Firm* — Kenneth A. Roddy

(57) ABSTRACT

A removable two-ring clamp has a first segmented ring assembly and a second segmented ring assembly that pivot relative to one another and can be individually loosened and tightened. The first ring assembly is received on and secured around an end portion of a first tubular section and the second ring assembly is received on and secured around an end portion of a second tubular section. The ring assemblies, when loosened, allow relative pivotal movement therebetween and allow the tubular sections to be rotated about their axes relative to one another to accommodate positioning the axes of the sections in any combination of planes, and when tightened, firmly hold the two tubular sections concentrically end-to-end in the proper position while a small tack weld or bonding agent is placed at their joined ends.

11 Claims, 2 Drawing Sheets

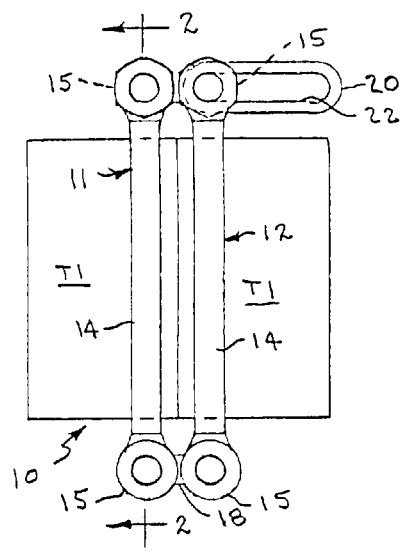
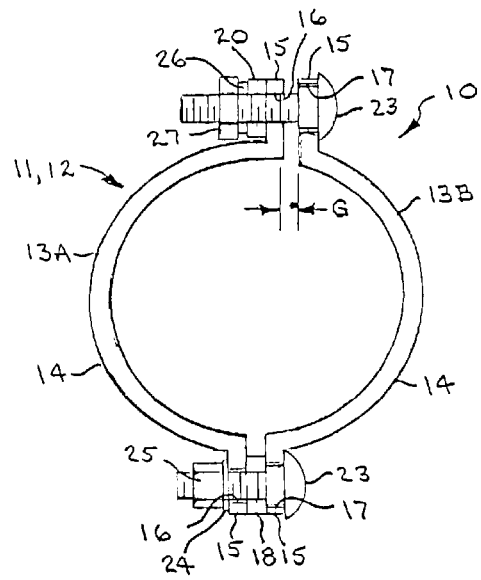
Fig. 1  Fig. 2
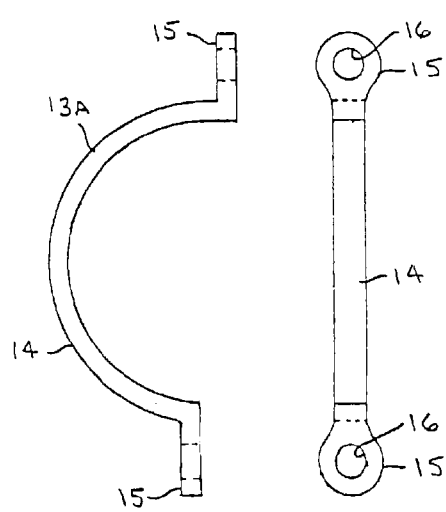
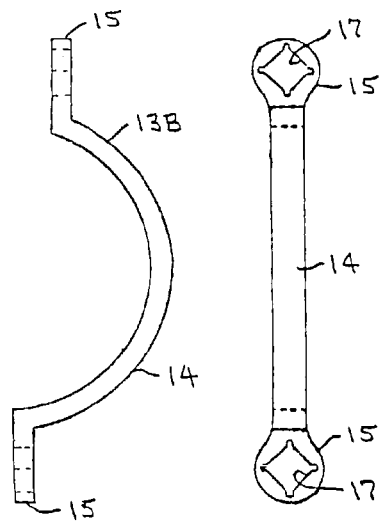
Fig. 3A  Fig. 3B  Fig. 4A  Fig. 4B

TACK WELDING CLAMPS FOR AXIALLY ALIGNING AND HOLDING CURVED OR STRAIGHT TUBULAR SECTIONS

BACKGROUND OF THE INVENTION

1. Field of the Invention

This invention relates generally to tack welding clamps, and more particularly to a removable two-ring clamp having a first segmented ring that is received on and secured around an end portion of a first tubular section and a second segmented ring that is received on and secured around an end portion of a second tubular section wherein the rings, when loosened, pivot relative to one another and also allow the tubular sections to be rotated relative to one another to accommodate positioning the axes of the sections in any combination of planes, and when tightened, firmly hold the two tubular sections concentrically end-to-end in the proper position while a small tack weld or bonding agent is placed at their joined ends.

2. Background Art

Many industries require the welding of sections of round tubing or pipe end-to-end to form complex shaped tubular assemblies; such as for example, refinery piping layouts, piping layouts in ships, submarines, aircraft, and spacecraft, civil engineering applications, sewer lines, exhaust systems for racing vehicles, and metal lines to carry exotic gases for silicon chip manufacturing to name a few. As used herein, the terms "tubular section" and tubular member" means one of several components of a tubular assembly.

Although there are many methods for holding tubular members and sections together for welding or bonding them together end-to-end, generally they apply to straight sections. The difficulty in attempting to hold the ends of curved or bent tubular members and pipes together, has been a longstanding problem for welders and pipe fitters, particularly when the sections are required to be concentric, axially aligned, and rotated in different planes relative to one another. Considerable time is spent determining the correct position and maintaining it while the sections are being welded or bonded. It is also challenging to ensure the concentricity between both tubular members. Bent metal tubular members have traditionally been "held in place" during welding through a variety of methods, such as temporarily using masking or metal tape around the facing sections, placing witness lines on the facing sections with a marker, and even super-gluing them if the bond only lasts for a few seconds.

There are several patents directed toward clamping devices of various construction designed to hold sections of round tubing or pipe end-to-end for welding or bonding them together end-to-end.

Fehlman, U.S. Pat. No. 3,422,519 discloses a portable lineup clamp for alignment of abutting sections of pipe prior to welding. The lineup clamp includes first and second hingeably connected arcuate portions each comprising parallel arcuate members supported by longitudinal crossbars, and a plurality of longitudinal rollers supported by the pipe when the arcuate portions are circumferentially clamped about the pipe joint. A semi-circular segment extends across the members at the unhinged end of the first segment and faces outward therefrom and a sleeve extends across the members at the unhinged end of the second segment and includes a rotatable shaft therein, and a handle attached to the shaft. The free ends of a U-shaped yoke elements are pivotally attached to the ends of the sleeve off center therefrom, and the bight portion is received over and into the semicircular segment. Rotational movement of the handle causes the arcuate portions to clamp about the pipe joint and align the same for welding.

Arntz et al, U.S. Pat. No. 3,722,038 discloses a pipe-clamping device for positioning two pipe sections in axial alignment and with a desired axial end separation therebetween includes two sets of pipe-clamping shoes that are moved into positive clamping engagement with first and second pipe sections respectively by chains engaging those shoes and extending around respective ones of the pipe sections, the shoes have slotted plates for receiving selected links of the chains and terminal turnbuckle adjusting mechanisms on the chains being used to tighten them and to provide the positive clamping engagement. Radially disposed and adjustable pipe positioning or centering pins are provided on extensions of the first set of shoes for obtaining correct axial alignment of the second pipe section with the first pipe section. Removable turnbuckle mechanisms extend between the pipe-clamping shoes of one set and those of the other set to permit adjustment of the axial separation between the two pipe sections.

McFadden, U.S. Pat. No. 3,925,854 discloses an alignment clamp that holds a pair of pipe sections or structural shapes in alignment for welding and includes a band which is secured to a first pipe section, the band being larger in diameter than such first pipe section and spaced from the first pipe section. The band comprises two segments which are hingedly connected and adapted to be locked over the first pipe section. Mounted upon the band are pairs of lever dogs pivotally supported by the band. The dogs are rotated relative to the band to cause forward ends of the dogs to grasp a second pipe section in alignment with the first. The lever dogs extend outwardly from the second pipe section to provide a gap under the dogs between the pipe sections to permit welding therebetween.

Dearman, U.S. Pat. No. 3,944,202 discloses a clamping assembly for aligning abutting ends of pipe sections to form a mitered joint. A plurality of individual clamp assemblies are clamped in circumferentially spaced positions upon one pipe section by a circumferentially extending chain, each clamp assembly having an elongate jack arm which can be clamped in selected positions of circumferential and axial adjustment upon the one pipe section so that the jack arms may be projected to different axial distances from the chain into operative engagement with a second pipe section lying in a plane inclined to axis of the one pipe section.

Kagimoto, U.S. Pat. No. 4,750,662 discloses a pipe clamping and alignment tool for locating and clamping pipe sections in end to end alignment for welding which includes a pair of clamping assemblies for the respective pipe sections threaded respectively on opposite-hand threads of a turnbuckle-type bolt. Each clamping assembly has a cradle for receiving the respective pipe section, a releasable U-bolt clamp for holding the pipe section on the cradle, and pairs of angled adjusting screws for engaging the pipe section and adjusting its alignment both longitudinally and laterally.

Poncelet, U.S. Pat. No. 5,165,160 discloses an apparatus and method for aligning conduits including pipes, pipe fittings and the like prior to joining. The apparatus includes a first ring assembly for removably encircling an end portion of a first conduit to be joined and a second ring assembly for removably encircling an end portion of a second conduit to be joined to the end portion of the first conduit. Circumferentially spaced bridge members extend between the first and second ring assemblies connecting them together axially spaced apart sufficiently to permit joining of the end portions of the conduits between the first and second ring assemblies. First and second screws on each bridge member move the first and second conduits into an axially aligned position. lly aligning the end portions of the first and second conduits, the aligning provisions being disposed between the ring members and including a plurality of adjustable contact surfaces for contacting respective end portions of the first and second conduits. The contact surfaces are moveable relative to each other to move the first and second conduits into an axially aligned position.

Collie. U.S. Pat. No. 6,325,277 discloses an apparatus and method for precisely aligning and holding first and second thin walled stainless steel sanitary tubing segments end-to-end to allow for tack welding of the segments together during a tube assembly process. The apparatus includes first and second pivotally connected C-shaped clamp halves that contact almost an entire circumferential path along the outer walls of both aligned tubing segments, each having first and second clamp portions separated by a cutout large enough to permit tack fusion welding at the seam, and a continuous inner surface contacting a respective portion of the tubing segments. A locking rod connecting the first and second clamp parts holds them in position about the ends of the first and second tubing segments. A threaded shaft is pivotally and slidably mounted on the rod and extends through a bracket to further connect the clamp portions, and a nut is threadedly received on the shaft. An elongated pin extends through the bore of the nut to permit sliding movement therein.

Shelton, U.S. Pat. No. 6,990,712 discloses a pipe joining tool which includes a mounting bracket for releasable attachment to a pipe. The mounting bracket has a U-shaped platform with an intermediate portion for engaging a pipe and a pair of slotted end portions extending from the opposite ends of the intermediate portion in a substantially parallel manner. A wedge slidably extends through the slots in the end portions for driving a pipe positioned within the U-shaped platform into tight engagement with the intermediate portion. A flexible link is secured to the mounting bracket and extends therefrom. A pipe fitting keeper is carried by the flexible link for releasably grasping a pipe fitting and suspending the pipe fitting adjacent the end of a pipe positioned within the U-shaped platform. A pair of spaced apart legs projects forwardly from the intermediate portion of the U-shaped platform. Each of the spaced apart legs has an internally threaded bore within which is positioned a bolt. Selective rotation of each bolt moves the pipe fitting suspended by the pipe fitting keeper into alignment with the end of a pipe positioned within the U-shaped platform.

SUMMARY OF THE INVENTION

The present invention overcomes the aforementioned problems and is distinguished over the prior art in general, and these patents n particular, by a removable two-ring clamp that temporarily holds together and locks in place around two tubular sections that are to be welded or bonded together end-to-end to form a tubular assembly. The tubular sections may be curved, straight, or combinations thereof, and need not necessarily be of the same diameter. The two-ring clamp has a first segmented ring that is received on and secured around an end portion of a first tubular section at a given point and a second segmented ring that is received on and secured around an end portion of a second tubular section. The second ring pivots relative to the first ring in an arc along a curved axis extending through the center of the two rings such that the rings can be disposed at an angle relative to one another. The first and second rings, prior to securing them into place, allow the tubular sections to be rotated relative to one another to accommodate positioning the axis of the bends of the curved tubular sections and/or the straight sections in any combination of planes. By strategically placing the first ring and its pivot point around a first tubular section, the appropriate swinging or pivoting arc that will match the curvature of the second tubular section can be quickly determined, regardless of its relative plane of rotation. The segmented rings are then manually tightened to firmly hold the two tubular sections end-to-end in the proper position while a small tack weld or bonding agent is placed at their joined ends. This process can be repeated for each joint in the assembly, for as many sections needed to be joined or welded together, by simple loosening the rings and moving them to the next location, until the assembly evolves into the desired shape. When all of the joints have been tack welded, the rings are loosened and slid off of the formed assembly, and the resulting joints can be permanent welded or bonded. The two-ring clamp is particularly suited to produce joints with no gap between them (commonly known as a butt joint) provided that the ends of the tubular sections are cut in a flat plane perpendicular to their axis or tangent line.

BRIEF DESCRIPTION OF THE DRAWINGS

FIG. 1 is a side elevation of the tack welding clamp in accordance with the present invention, shown on a pair of straight tubular sections.

FIG. 2 is a cross sectional view of a ring assembly taken along line 2-2 of FIG. 1.

FIGS. 3A and 3B are a side elevation view and end view, respectively, of a first half segment of the ring assembly showing a circular hole through each of its flange portions.

FIGS. 4A and 4B are a side elevation view and end view, respectively, of a second half segment of the ring assembly showing a square holes through the flange portions.

DESCRIPTION OF THE PREFERRED EMBODIMENTS

Figure 5:
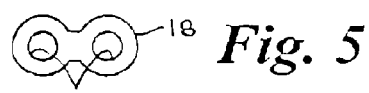
FIG. 5 is a side elevation view of a fixed length link member.

Referring to the drawings by numerals of reference, there is shown in FIGS. 1, 2, 3A, 3B, 4A and 4B, a preferred removable tack welding clamp 10 in accordance with the present invention, shown in an assembled condition. The clamp 10 has a first segmented ring assembly 11 and a second segmented ring assembly 12. Each ring assembly 11, 12, is formed a first half segment 13A and a second half segment 13B, and each half segment is formed of a rigid metal strap having a semicircular main body portion 14 with an outwardly extending flange portion 15 at each end. The flange portions 15 at each end of the first half segment 13A have circular holes 16 extending therethrough. The flange portions 15 at each end of the second half segment 13B have a square hole 17 extending therethrough. In a preferred embodiment, the semicircular main body portion 14 of the first half segment 13A extends circumferentially a short distance further than the semicircular main body portion 14 of the second half segment 13B, such that the outwardly extending flange portions 15 at one end of the half segments 13A and 13B are diametrically offset from the plane of the outwardly extending flange portions at the opposed ends, for reasons that are described below.

Figure 6:
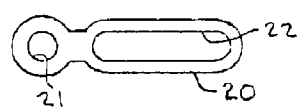
FIG. 6 is a side elevation view of several variable length link members.
Figure 6:

Referring additionally to FIGS. 5 and 6, the first and second half segments 13A and 13B of each ring assembly 11, 12 are held together by a first fixed length link 18 (FIG. 5) and a second variable length link 20 (FIG. 6). The fixed length link 18 is a relatively short thin flat member having a circular hole 19 near each end. The variable length link 20 is a longer thin flat member having a circular hole 21 near one end and a longitudinal slot 22 therethrough that begins closely adjacent to the hole and terminates near the opposed end. As seen in FIG. 6, a number of variable length links 20 may be provided in different lengths that have longer longitudinal slots 22.

One end of the first and second half segments 13A and 13B of each ring assembly 11, 12 are assembled together by inserting the fixed length link 18 between the opposed facing surfaces of the outwardly extending flange portions 15 at one end of the half segments such that the circular holes 16 and square holes 17 in the flange portions are aligned with the circular holes 19 in the fixed length link. A square-neck bolt, or carriage bolt 23 is installed through each set of the aligned circular and square holes in the outwardly extending flange portions with the square shoulder of the carriage bolts received in the square holes 17. A low-friction washer 24 is slid onto the shank of each carriage bolt 23, and a nylon-insert nut 25 is threadedly engaged on the outer end of the shank. Thus, the outwardly extending flange portions 15 at one end of the half segments 13A and 13B are pivotally connected to the fixed length link 18. The low-friction washers 24 provide easy rotation and the nylon-insert nuts 26 prevent the nuts from backing off during rotation and do not require frequent tightening to hold this end of the first and second half segments 13A and 13B together. The fixed length link 18, when assembled between the outwardly extending flange portions 15 at one end of the half segments 13A and 13B, creates a gap G between the opposed facing surfaces of the flange portions 15 at the opposed end.

The opposed ends 15 of the first and second half segments 13A and 13B of each ring assembly 11, 12 are assembled together by inserting the shank of a pair of square-neck bolts, or carriage bolts 23 through the square holes 17 and the aligned circular holes 16 in the outwardly extending flange portions, inserting the circular hole 21 of the variable length link 20 onto the shank of one carriage bolt, and the longitudinal slot 22 of the link 20 onto the shank of the second carriage bolt, sliding a lock washer 26 onto each shank, and then threadedly engaging a standard nut 27 on the outer end of the shank of each carriage bolt. The nut 27 on the outer end of one of the carriage bolts 23 can be loosened to allow the variable length link 20 to be angularly adjusted, and the nut on the outer end of the other one of the carriage bolts can be loosened to allow the second carriage bolt to travel along the longitudinal slot 22, as one ring assembly 12 pivots relative to the other ring assembly 11. The nuts 27 can then be tightened to secure the ring assemblies 11, 12, angularly relative to one another along an arc extending along a curved axis extending through the center of the two ring assemblies such that the ring assemblies are concentric with respect to the curved axis.

Thus, when assembled together, the first and second half segments 13A and 13B of each ring assembly 11, 12, form a pair of generally circular ring configurations for encircling an end portion of a respective tubular section. It should be understood that the nuts 27 on the outer ends of one or both of the carriage bolts 23 can be loosened to allow the tubular sections which they encircle to be rotated relative to one another to position the axis of the bends of curved tubular sections and/or straight tubular sections in any combination of planes and then be retightened. When the first and second half segments 13A and 13B of each ring assembly 11, 12, encircle the end portions of respective tubular sections, the fixed length link 18 and the variable length link 20 are disposed substantially in diametrically opposed relation in a plane in outwardly aligned relation to the axes of the tubular sections.

Figure 7:
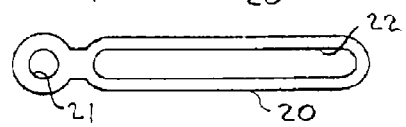
FIG. 7 is a side elevation of the tack welding clamp shown on a straight tubular section abutted to a curved tubular section.
Figure 7:
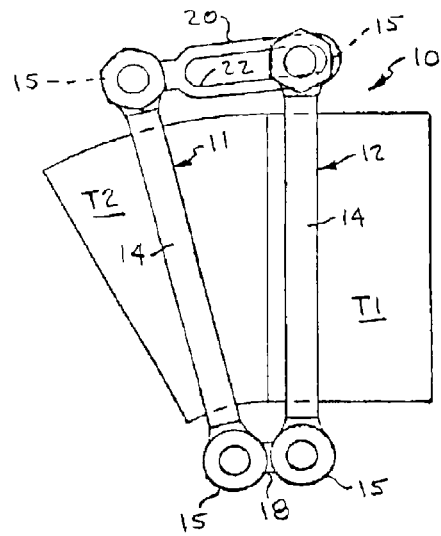
Figure 8:
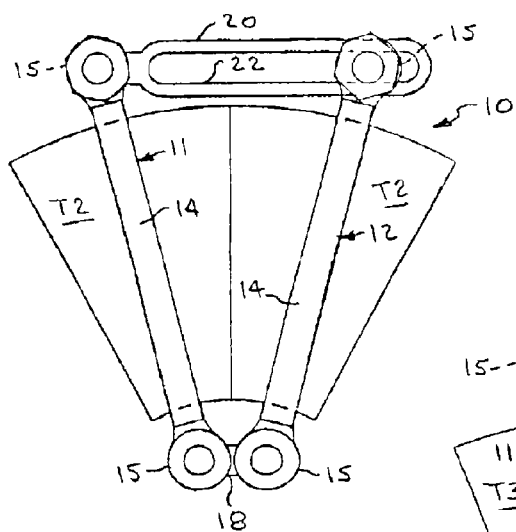
FIG. 8 is a side elevation of the tack welding clamp shown on a pair of curved tubular sections.

The fixed length link 18 provides the pivoting point that allows the tubular sections to be butted end-to-end regardless of the plane of orientation. The variable length link 20 with the slot 22 provides the angular travel, or arc required, and when the nuts 27 are tightened they lock the shape and relative rotation between the tubular sections into position. This procedure allows the joining together of a pair of straight tubular sections T1 as seen in FIG. 1, or a straight tubular section T1 to a curved or bent tubular section T2 as seen in FIG. 7, and also a pair of curved or bent tubular sections T2 as seen in FIG. 8. The clamps 10 thus butt the ends of two equal diameter tubular sections together to form a joint that is concentric between the tubular sections.

Figure 9:
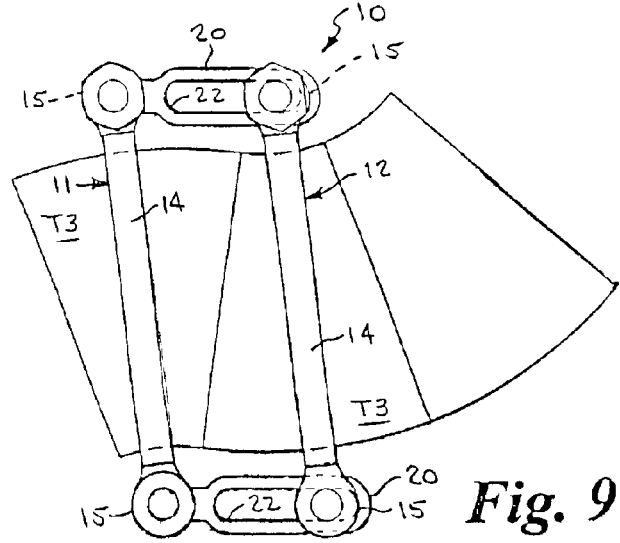
FIG. 9 is a side elevation of the tack welding clamp shown on a pair of reversed curved tubular sections, and utilizing a second variable length link member in place of the fixed length link member.

In some applications, the fixed length link 18 may be replaced with a variable length link member 20. For example, FIG. 9 shows the tack welding clamp 10 installed on a pair of reversed curved tubular sections T2, and utilizing a second variable length link member 20 in place of the fixed length link member.

The gap G between the opposed facing surfaces of the outwardly extending flange portions 15 at the end of the half segments 13A and 13B, which are connected to the variable length link 20, allows the half segments at this end to accommodate variations in the diameter of the tubular sections. The carriage bolts 23 and standard nuts 27, allow the user to fix one ring assembly 11 around an end portion of a first tubular section using only one hand before pivoting and sliding the other ring assembly 12 onto an end portion of a second tubular section to be welded. The proper relative position between the tubular sections is found by test fitting the opposed facing ends of the tubular sections together until the gap between the facing ends is eliminated, and then the nut 27 of the other ring segment which is at the end of the carriage bolt 23 disposed in the longitudinal slot 23 of the variable length link 20 is tightened. This procedure locks both the axial position and plane of rotation of both tubular sections, even in the presence of a gap between the half segments of the ring assemblies due to tube diameter variations. This procedure also creates coaxial alignment or concentricity between the tubular sections. The user can then tack weld or temporarily bond the joined ends.

It should be understood that different sizes ring assemblies 11, 12 can be combined to create stepped joints. For example, 1⅞" OD to 2" OD steps in a tight layout. Substantially any bend plane and any bend radius are possible.

Operation

The following description is a non-limiting example of a typical tack welding operation using the present tack welding clamps to join bent or curved metal tubular sections together to from a complex shaped and assemblies. It should be understood that this operation may be carried out using tubular sections made of other materials such as plastic, and that the sections may be temporarily joined together using a bonding agent or other conventional joining means rather than tack welding.

The process starts by having the tubular sections that will form the tubular assembly cut to length and ready for welding. Preferably, the ends of the sections are cut so as to be perpendicular to the tangent line of the section. The sections may be prepared by conventional means, or may be easily and quickly accomplished by utilizing a patented apparatus and method for modeling and fabricating tubular members shown and described in U.S. Pat. Nos. 7,124,575 and 7,603,853, which are hereby incorporated herein by reference.

The first ring assembly 11 is positioned a short distance from the end of the first tubular section, for example about 1/8" from the end. Depending upon the particular assembly to be formed, it is suggested that the first tubular section should be the "straighter" of the two sections to be joined. The first ring assembly 11 is initially rotated such that its pivot point is located generally in a direction corresponding to the direction that the arc of the second section points to. The first ring assembly 11 is then tightened gently with one hand sufficient to preserve the pivot location by frictional engagement, but also to allow for manually rotated adjustments.

With the first ring assembly 11 semi-tight, the mating end of the second tubular section is inserted into the second ring assembly 12, and positioned to follow the arc of the joint. The facing ends of the first and second tubular sections are manually pressed together to eliminate the gap between them, and the ring assemblies 11, 12, are adjusted so that the joint line sits evenly between the two rings assemblies. Then, the tubular sections are rotated until the desired shape of the gapless joint is achieved. By test-fitting the assembly, the perfect location can be found very quickly. At that point, the ring assemblies 11, 12, can be tightened firmly. This process continues for all joints in the tubular assembly, using a clamp 10 at each joint. With each added tubular section, the proper rotation can be fine tuned by loosening and tightening the ring segments and rotating the tubes; and by test fitting the assembly in its intended location. This process continues until the resulting tubular assembly achieves the desired shape and fitment and all joint gaps have been eliminated. The next step is to tack-weld all of the joints in a single session. At least two opposing tack welds are suggested. The present clamping system offers sufficient spacing between the ring assemblies 11, 12, even on the tightest bend combinations, to easily place the tack welds. After the tubular assembly is tacked in place, the ring assemblies 11,12, are loosened and slid off of the assembly. Then, the joints of the tubular assembly can be welded completely, in many cases without the need of filler rod because there are no gaps to fill.

As stated above, it should be understood that this operation may be carried out using tubular sections made of other materials such as plastic, and that the sections may be temporarily joined together using a bonding agent or other conventional joining means rather than tack welding.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An adjustable removable two-ring clamp assembly for temporarily holding together and locking in place two tubular sections that are to be welded or bonded together to form an assembly, the clamps comprising:
   a two-ring clamp assembly having a first segmented ring assembly adapted to be received on and secured around an end portion of a first tubular section at a given point and a second segmented ring assembly adapted to be received on and secured around an end portion of a second tubular section;
   each said first and second segmented ring assembly formed of a first half segment and a second half segment, each half segment formed of a metal strap having a semicircular main body portion with an outwardly extending flange portion at each end, said flange portions at each end of said first half segment having a circular hole therethrough, said flange portions at each end of said second half segment having a square hole extending therethrough, and said outwardly extending flange portions of said first and said second half segments disposed in opposed facing relation when received on said first and said second tubular sections;
   first and second link members disposed between opposed facing surfaces of said outwardly extending flange portions of said half segments;
   a first and a second carriage bolt installed through each of said aligned circular and square holes in said outwardly extending flange portions and said first and second link members, respectively, and a nut at an outer end of each said carriage bolt for loosening and tightening said link members;
   said first ring assembly and said second ring assembly pivotally connected together by said first and second carriage bolt and nut and said first and second link members to pivot relative to one another in an arc along a curved axis extending through the center of each said ring assembly so as to be disposed at an angle relative to one another; whereby
   said first and second carriage bolts and said first and second link members in a loosened condition allow the end portions of the tubular sections to be butted together concentrically end-to-end and rotated relative to one another about their respective axes to accommodate selective positioning of the axes of curved tubular sections and/or straight tubular sections in a combination of planes;
   said first and second carriage bolts and said first and second link members in a tightened condition secures each said ring assembly around the end portion of the first tubular section and end portion of the second tubular section, respectively, in the butted together concentric end-to-end relation to allow placement of tack welds or a bonding agent along their butted together ends; and
   said first and second carriage bolts and said first and second link members selectively loosened to allow removal of said ring assemblies from the joined tubular sections, or repositioning thereon for receiving another tubular section and repeating the positioning and tack welding or bonding procedure at another end.

2. The adjustable removable two-ring clamp assembly according to claim 1, wherein
   said semicircular main body portion of said first half segment extends circumferentially a distance further than said semicircular main body portion of said second half segment such said outwardly extending flange portions at one end of said first half segment and said second half segment are diametrically offset from said outwardly extending flange portions at the opposed ends thereof.

3. The adjustable removable two-ring clamp assembly according to claim 1, wherein
said first and second link members comprise a first thin flat link member having a circular hole near each end and a second thin flat link member having a circular hole near one end and a longitudinal slot therethrough that begins closely adjacent to said hole near one end and terminates near the opposed end.

4. The adjustable removable two-ring clamp assembly according to claim 3, wherein
said first and second half segments of each said first and second segmented ring assembly are assembled together by inserting said first link member between opposed facing surfaces of said outwardly extending flange portions at one end of said half segments such that said circular holes and said square holes in said flange portions are aligned with said circular holes in said first link member;
a said carriage bolt is installed through each set of said aligned circular and square holes in said outwardly extending flange portions, respectively, with a square shoulder thereof received in said square holes;
a low-friction washer is received on the shank of each said carriage bolt, and said nut is a nylon-insert nut is threadedly engaged on the outer end of said shank such that said outwardly extending flange portions at said one end of said first and second half segments are pivotally connected to said first link member and said low-friction washers allow relative rotation and said nylon-insert nuts prevent said nuts from backing off during rotation.

5. The adjustable removable two-ring clamp assembly according to claim 4, wherein
the shanks of said first and second carriage bolt are received through said square holes and said aligned circular holes in said outwardly extending flange portions, respectively, with said circular hole of said second link member received on the shank of said first carriage bolt, and said longitudinal slot of said second link member received on the shank of said second carriage bolt, a lock washer is received on each said shank, and a said nut is threadedly engaged on the outer end of the shank of each said first and second carriage bolt; and
loosening said nut on said outer end of said first carriage bolt allows said second link member to be angularly adjusted, and loosening said nut on said outer end of said second carriage bolt allows said second carriage bolt to travel along said longitudinal slot of said second link member, such that one said ring assembly pivots relative to the other said ring assembly; and
tightening said nuts on said outer end of said first and second carriage bolts secures said ring assemblies angularly relative to one another along an arc extending along a curved axis extending through the center of said first and second ring assemblies such that said ring assemblies are concentric with respect to the curved axis.

6. The adjustable removable two-ring clamp assembly according to claim 5, wherein
said first and second half segments of each said first and second segmented ring assembly, in an assembled condition, form a pair of generally circular ring configurations for encircling an end portion of a respective tubular section with said first link member and said second link member disposed substantially in diametrically opposed relation in a plane in outwardly aligned relation to the axes of the tubular sections; and
said nuts on said outer end of said first and second carriage bolts are selectively loosened to allow said tubular sections which they encircle to be rotated relative to one another to position the axis of the bends of curved tubular sections and/or straight tubular sections in any combination of planes and then retightened.

7. The adjustable removable two-ring clamp assembly according to claim 1, wherein
said first and second link members comprise a first thin flat link member and a second thin flat link member each having a circular hole near one end and a longitudinal slot therethrough that begins closely adjacent to said hole near one end and terminates near the opposed end.

8. The adjustable removable two-ring clamp assembly according to claim 7, wherein
said first link member is disposed between opposed facing surfaces of said outwardly extending flange portions at one end of said half segments such that said circular holes and said square holes in said flange portions are aligned with said circular holes and said longitudinal slot of said first link member;
a said carriage bolt is installed through each set of said aligned circular and square holes in said outwardly extending flange portions, respectively, with a square shoulder thereof received in said square holes;
a low-friction washer is received on the shank of each said carriage bolt, and said nut is a nylon-insert nut is threadedly engaged on the outer end of said shank such that said outwardly extending flange portions at said one end of said first and second half segments are pivotally connected to said first link member and said low-friction washers allow relative rotation and said nylon-insert nuts prevent said nuts from backing off during rotation.

9. The adjustable removable two-ring clamp assembly according to claim 8, wherein
the shanks of said first and second square-neck carriage bolt are received through said square holes and said aligned circular holes in said outwardly extending flange portions, respectively, with said circular hole of said second link member received on the shank of said first carriage bolt, and said longitudinal slot of said second link member received on the shank of said second carriage bolt, a lock washer is received on each said shank, and a said nut is threadedly engaged on the outer end of the shank of each said first and second carriage bolt; and
loosening said nut on said outer end of said first carriage bolt allows said second link member to be angularly adjusted, and loosening said nut on said outer end of said second carriage bolt allows said second carriage bolt to travel along said longitudinal slot of said second link member, such that one said ring assembly pivots relative to the other said ring assembly; and
tightening said nuts on said outer end of said first and second carriage bolts secures said ring assemblies angularly relative to one another along an arc extending along a curved axis extending through the center of said first and second ring assemblies such that said ring assemblies are concentric with respect to the curved axis.

10. The adjustable removable two-ring clamp assembly according to claim 9, wherein
said first and second half segments of each said first and second segmented ring assembly, in an assembled condition, form a pair of generally circular ring configurations for encircling an end portion of a respective tubular section with said first link member and said second link member disposed substantially in diametrically opposed relation in a plane in outwardly aligned relation to the axes of the tubular sections; and said nuts on said outer end of said first and second carriage bolts are selectively loosened to allow said tubular sections which they encircle to be rotated relative to one another to position the axis of the bends of curved tubular sections and/or straight tubular sections in any combination of planes and then retightened.

11. A method for temporarily holding together and locking in place two tubular sections that are to be welded or bonded together to form an assembly, comprising the steps of:

provide a two-ring clamp assembly having a first segmented ring assembly and a second segmented ring assembly pivotally connected together by a first and second link member as recited in claim 1;

placing the first segmented ring assembly on a first tubular section adjacent to one end thereof and rotating said first segmented ring assembly such that its pivot point is located generally in a direction corresponding generally to a direction of the axis of a second tubular section;

tightening said first segmented ring assembly sufficient to preserve the pivot location by frictional engagement, and allow for manually rotated adjustments;

inserting a mating end of a second tubular section into the second segmented ring assembly and positioning said second tubular section to follow the axis of the joint;

pressing facing ends of the first and second tubular sections together to eliminate any gaps between them;

adjusting said first and second segmented ring assemblies such that a joint line is disposed evenly between the two segmented ring assemblies;

rotating said first and second tubular sections to achieve a desired shape of the joint;

tightening said first and second segmented ring assemblies firmly to prevent relative movement;

repeating the steps recited above for all joints in the tubular assembly, using a said two-ring clamp assembly at each joint, until the resulting tubular assembly achieves a desired shape and fitment and all joint gaps have been eliminated;

tack welding or bonding all of the joints; and thereafter loosening said first and second segmented ring assemblies of each said two-ring clamp assembly and sliding them off of the tack welded or bonded tubular sections such that the joints of the tack welded or bonded tubular sections can be welded or bonded completely.

\* \* \* \* \*